United States Patent
Marshall et al.

(10) Patent No.: US 8,678,180 B2
(45) Date of Patent: Mar. 25, 2014

(54) MODULAR CONVEYOR BELT WITH EXTENDED RAISED RIBS

(75) Inventors: Angela Longo Marshall, Harahan, LA (US); Stephen T. Ferrell, Slidell, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/557,847

(22) Filed: Jul. 25, 2012

(65) Prior Publication Data

US 2014/0027250 A1     Jan. 30, 2014

(51) Int. Cl.
B65G 17/06     (2006.01)

(52) U.S. Cl.
USPC .......................................... 198/853; 198/779

(58) Field of Classification Search
USPC .................................. 198/853, 851, 850, 779
See application file for complete search history.

(56) References Cited

U.S. PATENT DOCUMENTS

| | | | | |
|---|---|---|---|---|
| 2,987,167 | A * | 6/1961 | Franz | 198/853 |
| 4,153,152 | A | 5/1979 | Lapeyre | |
| 4,742,907 | A | 5/1988 | Palmaer | |
| 5,125,504 | A * | 6/1992 | Corlett et al. | 198/850 |
| 5,307,923 | A | 5/1994 | Damkjaer | |
| 5,586,643 | A * | 12/1996 | Zabron et al. | 198/853 |
| 5,613,597 | A | 3/1997 | Palmaer et al. | |
| 6,142,295 | A | 11/2000 | Greve | |
| 6,223,889 | B1 | 5/2001 | Layne et al. | |
| 6,308,823 | B1 * | 10/2001 | Stevens | 198/790 |
| 6,357,581 | B1 | 3/2002 | Guldenfels | |
| 6,382,404 | B1 * | 5/2002 | Guldenfels | 198/850 |
| 6,382,405 | B1 | 5/2002 | Palmaer | |
| 6,471,048 | B1 | 10/2002 | Thompson, Jr. et al. | |
| 6,571,937 | B1 * | 6/2003 | Costanzo et al. | 198/779 |
| 6,644,466 | B2 | 11/2003 | Knott et al. | |
| 7,073,662 | B2 | 7/2006 | Neely et al. | |
| 7,168,557 | B2 * | 1/2007 | Mitchell et al. | 198/852 |
| 7,360,641 | B1 * | 4/2008 | Fourney | 198/779 |
| 7,530,454 | B2 | 5/2009 | Neely et al. | |
| 7,530,455 | B2 * | 5/2009 | Lucchi | 198/853 |
| 7,588,137 | B2 * | 9/2009 | Fourney | 198/779 |
| 8,167,118 | B2 | 5/2012 | Fourney | |

(Continued)

FOREIGN PATENT DOCUMENTS

| | | |
|---|---|---|
| DE | 7246322 U | 4/1973 |
| EP | 1266846 A2 | 12/2002 |
| WO | 2012151127 A1 | 11/2012 |

OTHER PUBLICATIONS

International Search Report and Written Opinion of the International Searching Authority, PCT/US2013/051578, mailed Oct. 7, 2013, Korean Intellectual Property Office, Daejeon Metropolitan City, Republic of Korea.

*Primary Examiner* — Gene Crawford
*Assistant Examiner* — Keith R Campbell
(74) *Attorney, Agent, or Firm* — James T. Cronvich

(57) ABSTRACT

A modular conveyor belt having extended raised ribs that overlap to prevent the top conveying surface of the belt from opening up as the belt articulates forward around a sprocket at a hinge joint. Protrusions extend from the raised ribs past the ends of the belt modules. When rows of belt modules are connected together at hinge joints, the interleaved protrusions overlap laterally over a range of articulation angles. The modules may include cavities for roller assemblies, such as engaged stacked rollers in which a bottom roller is allowed to float vertically to maintain good contact with the top roller as they wear.

22 Claims, 5 Drawing Sheets

(56) References Cited

U.S. PATENT DOCUMENTS

| | | | |
|---|---|---|---|
| 8,225,922 B1* | 7/2012 | Fourney | 198/370.09 |
| 8,424,675 B2* | 4/2013 | Rau | 198/779 |
| 2004/0065530 A1* | 4/2004 | Shibayama et al. | 198/853 |
| 2008/0217142 A1 | 9/2008 | Menke | |
| 2011/0056807 A1 | 3/2011 | Fourney | |
| 2011/0278136 A1 | 11/2011 | Weiser | |

* cited by examiner

MODULAR CONVEYOR BELT WITH EXTENDED RAISED RIBS

BACKGROUND

The invention relates generally to power-driven conveyors and more particularly to modular conveyor belts constructed of rows of belt modules linked together at hinges between adjacent rows.

Modular conveyor belts are constructed of rows of belt modules linked together at hinges that allow the belt to articulate forward about drive and idle sprockets and backward about return rollers and shoes or on entering an incline. In some applications, it is important that the top conveying surface of the belt remain generally continuous and not open up as the belt articulates around sprockets.

SUMMARY

This shortcoming, as well as others, is addressed by a conveyor belt embodying features of the invention. One version of such a conveyor belt comprises a series of rows of one or more belt modules hingedly linked together end to end. A hinge axis formed between each row in a lateral direction perpendicular to a direction of belt travel allows the belt to articulate through an articulation range. Each of the belt modules includes link elements that are spaced apart in the lateral direction and that terminate in link ends along opposite first and second module ends defining the module length longitudinally in the direction of belt travel. Each of the link elements has a bottom forming a bottom surface of the conveyor belt and an opposite top. Raised ribs extend longitudinally along the tops of at least some of the link elements to distal ends. The raised ribs have upper surfaces forming a top surface of the conveyor belt. At least some of the raised ribs include protrusions that extend longitudinally from the distal ends of the raised ribs past the link ends. The link ends of belt modules of adjacent rows are interleaved at the hinge axis. The protrusions on adjacent rows are long enough to overlap along a lateral line of sight through the articulation range.

BRIEF DESCRIPTION OF THE DRAWINGS

Other versions, features, and aspects of the invention, as well as its advantages, are described in more detail in the following description, appended claims, and accompanying drawings, in which:

DETAILED DESCRIPTION

Figure 1:
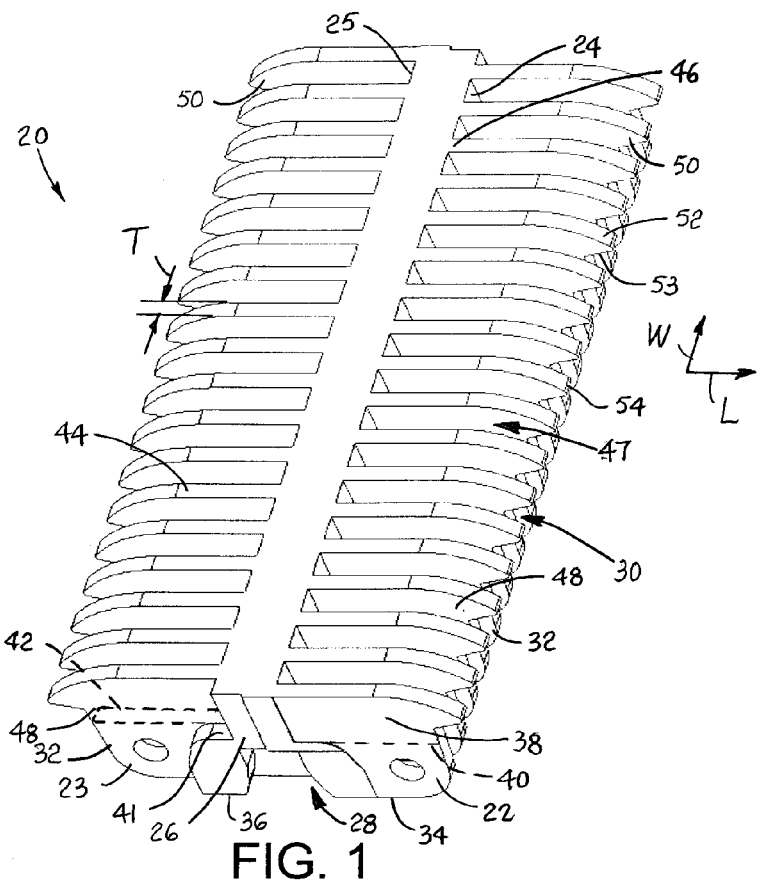
FIG. 1 is an oblique view of a conveyor belt module embodying features of the invention.

One version of a conveyor belt module embodying features of the invention is shown in FIG. 1. The belt module 20 comprises a first set of link elements 22 that extend from a first side 24 of an intermediate portion 26 of the module and a second set of link elements 23 that extend from an opposite second side 25 of the intermediate portion. The intermediate portion also has drive pockets 28 formed in its bottom to receive the teeth of drive and idle sprockets. The link elements 22, 23 of each set are spaced apart laterally across the width W of the module with gaps 30 formed between consecutive link elements. In this version, the gaps are less than 5 mm in width to comply with European safety standards. The link elements 22, 23 extend in opposite longitudinal directions to link ends 32 that define the length L of the module. Each of the link ends 32 has a bottom 34 that forms a bottom surface 36 of the module. Raised ribs 38 are formed atop the link elements 22, 23. Because in this version the lateral thickness T and the longitudinal length of the raised ribs and the link elements are the same, there is no clear demarcation between the raised ribs and the link elements. But an imaginary demarcation 40 can be defined that separates a top 42 of the link element from the raised rib 38. The imaginary demarcation can be defined as lying in the same plane as the horizontal surface 41 of the intermediate portion 26.

The raised ribs 38 have an upper surface 44 forming a top surface 46 of the conveyor belt module 20. The continuity of the top surface is interrupted by gaps 47 between the raised ribs 38. The ribs extend atop the link elements 22, 23 in opposite longitudinal directions from the intermediate portion 26 to distal ends 48. Protrusions 50 extend longitudinally out from the distal ends of the raised ribs past the link ends 32. The protrusions 50 in this example have upper and lower surfaces 52, 53 that converge toward each other away from the distal ends 48 of the raised ribs 38 and meet at a nose 54. In this example, the upper surfaces 52 slope downward away from the distal ends, and the lower surfaces 53 slope upward.

Figure 2:
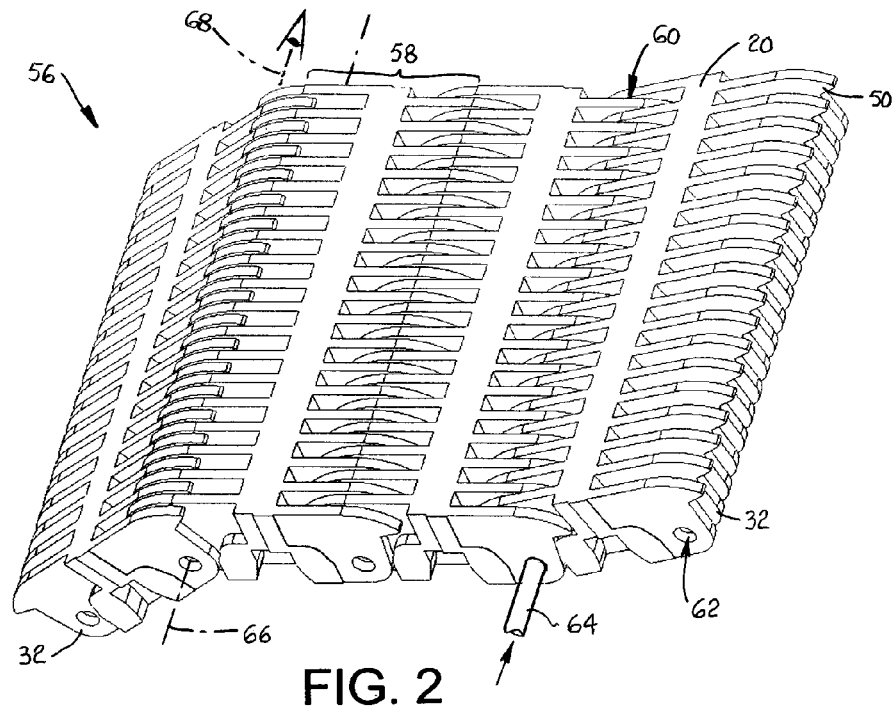
FIG. 2 is an oblique view of a portion of a conveyor belt module as in FIG. 1.

A portion of the conveyor belt constructed of belt modules 20 as in FIG. 1 is shown in FIG. 2. The belt 56 is constructed of rows 58 of one or more—in this example, one—belt modules 20. The link ends 32 of adjacent rows 58 are interleaved at hinge joints 60. Apertures 62 formed in the link ends are laterally aligned with the apertures of interleaved link ends of an adjacent row to form a lateral passageway at the hinge joint. A hinge rod 64 received in the passageway hingedly connects the rows 58 together at the hinge joint. The hinge rod 64 defines a hinge axis 66 about which adjacent rows of modules can pivot so that the belt can articulate forward around drive and idle sprockets and backward over return rollers and shoes. The modules shown in this example are conventionally made of a thermoplastic polymer material and formed by injection molding, but could be made of other materials or by different processes.

Figure 3:
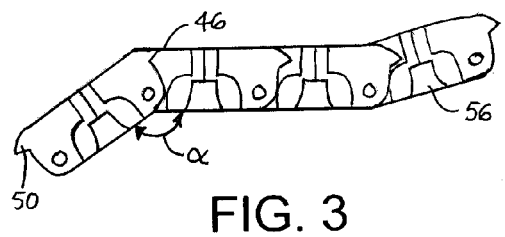
FIG. 3 is a side elevation view of the conveyor belt of FIG. 2 showing its articulation.

The four rows 58 of modules shown in FIGS. 2 and 3 are shown in an imaginary configuration to illustrate both forward and backward articulation. The two rightmost rows 58 in the figures are depicted in a backward articulation, or back bend, about the hinge axis 66. The two middle rows 58 are depicted in an unbent, straight-running relationship. The two leftmost rows are depicted articulating forward. In all three bend relationships, the protrusions 50 of one row overlap the interleaved protrusions of an adjacent row when viewed along a lateral line of sight 68 parallel to the hinge axis 66. Thus, the protrusions overlap each other over an articulation range from back bend to a maximum forward articulation indicated by a minimal articulation angle α shown in FIG. 3. The overlap prevents the formation of a lateral gap in the top surface 46 of the conveyor belt 56 at maximum forward articulation that could cause conveyed articles to catch on the discontinuity.

Figure 4:
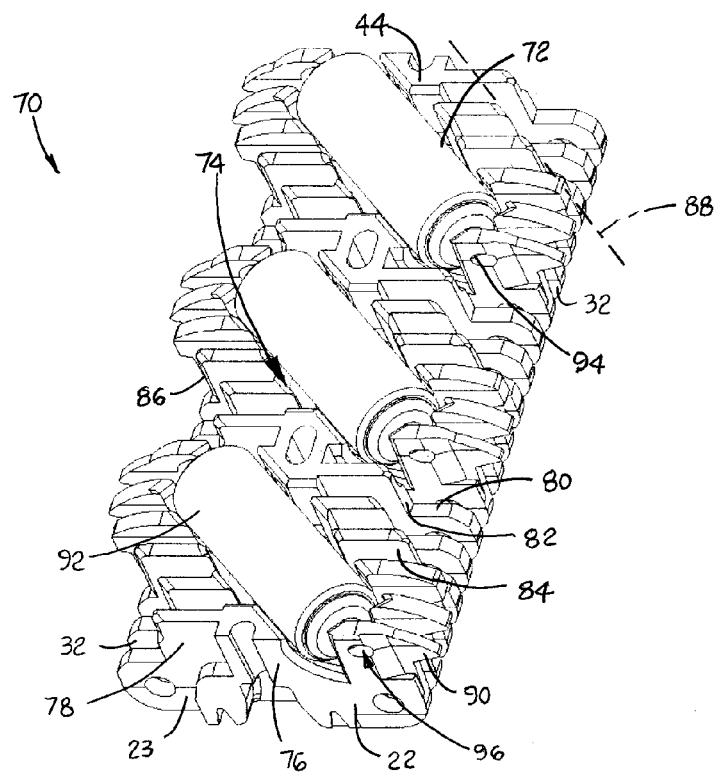
FIG. 4 is an oblique view of another version of a conveyor belt module embodying features of the invention, including a roller assembly.
Figure 5:
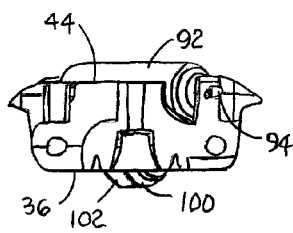
FIG. 5 is a side elevation view of the conveyor belt module of FIG. 4.
Figure 6:
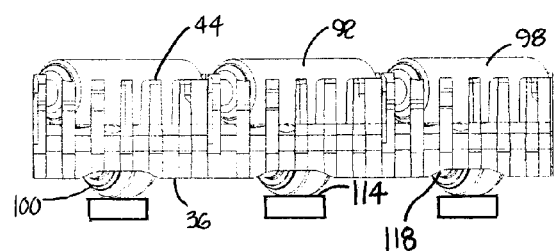
FIG. 6 is a front elevation view of the conveyor belt module of FIG. 4.

Another conveyor belt module embodying features of the invention is depicted in FIGS. 4-6. The module 70 shares many of the features of the module 20 of FIG. 1, but has additional features. The belt module 70 includes a roller assembly 72 received in a cavity 74 in an intermediate portion 76 of the module. Link elements 22, 23 extend from the intermediate portion in opposite longitudinal directions out to link ends 32 defining the ends of the module. Raised ribs 78 extend longitudinally along tops 80 of the link elements to distal ends 82. In this module, some of the raised ribs are short raised ribs 84 that do not extend along the full length of the tops 80 of the link elements 22, 23. The distal ends of the short raised ribs are recessed inward of the link ends 32. Some of the short raised ribs have distal ends 86 angled on a bias and aligned with the distal ends of adjacent raised ribs along a line 88 oblique to the module width. Other of the raised ribs 78 have protrusions 90, like those of FIG. 1, that extend past the link ends 32 to prevent the hinge joint from opening as a belt made of these modules articulates forward.

The roller assembly includes a top roller 92 rotatably retained in the cavity 74 by an axle 94 whose ends are supported in holes 96 formed in raised ribs bounding the cavity. A salient portion 98 of the roller 92 protrudes above the upper surfaces 44 of the raised ribs 78 to support conveyed articles.

Figure 7:
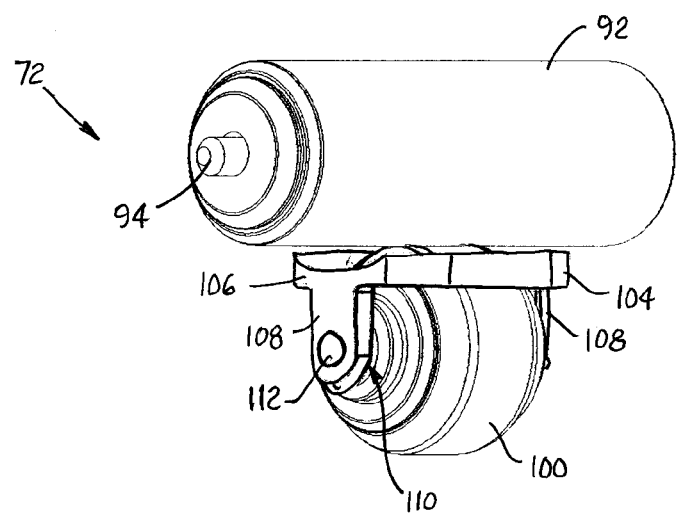
FIG. 7 is an isometric view of the roller assembly of FIG. 4.

As shown in FIGS. 5 and 6, the roller assembly may also include a bottom roller 100 rotatably received in the cavity 74, which opens onto the bottom surface 36 of the module. A salient portion 102 of the bottom roller protrudes from the cavity below the bottom side of the module. As shown in FIG. 7, the bottom roller 100 of the roller assembly 72 is mounted in a carrier 104 having a ring 106 from which two ears 108 depend. Opposite ends of an axle 110 on which the bottom roller 100 rotates are supported in holes 112 in the ears. A salient portion of the bottom roller extends through the ring 106 into contact with the top roller 92. When the module is connected with other modules to form a conveyor belt in a conveyor system that has bearing surfaces 114 underlying the belt and supporting the bottom rollers 100 as in FIG. 6, the bottom rollers rotate on the bearing surfaces as the belt advances in the direction of belt travel. The rotation of the bottom rollers 100 on their axles 110 rotates the top rollers 92 on their axles 94 in the opposite direction by frictional contact. The rotation of the rollers pushes articles conveyed atop the top rollers across the belt. Either or both of the top and bottom rollers could have an outer high-friction tread or coating for better frictional contact.

Figure 8:
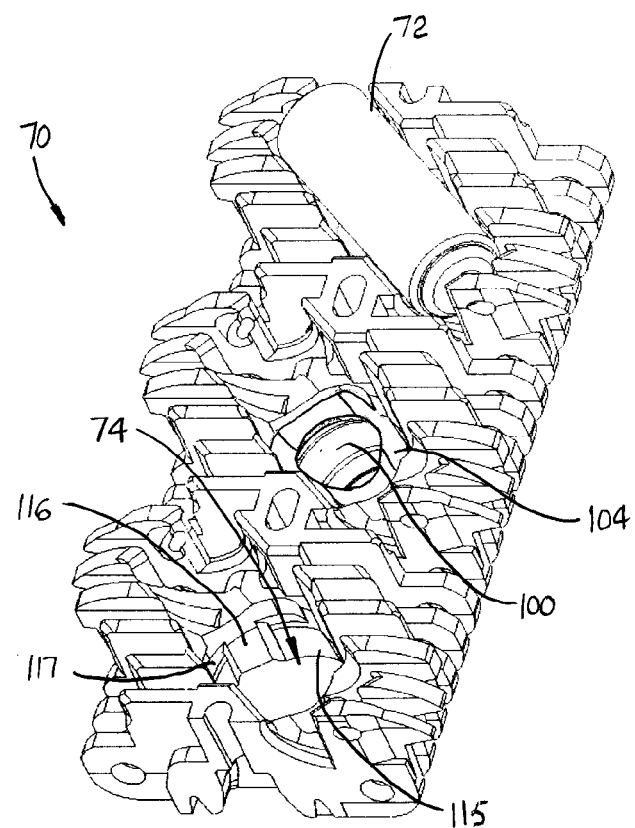
FIG. 8 is an oblique view of the belt module of FIG. 4 with the roller assembly shown in partial states of assembly.

FIG. 8 shows three roller cavities 74 in the conveyor belt module 70. The uppermost cavity on the sheet of FIG. 8 is shown with a complete stacked roller assembly 72. The middle cavity is shown with only a bottom roller 100 in its carrier 104 for illustrative purposes. The lowermost cavity is empty to show the wall structure of the cavity that coacts with the carrier 104. The wall structure 115 has two diametrically opposite vertical grooves 116, which retain the ears 108 (as shown in FIG. 7) of the carrier 104 and maintain the axis of the bottom roller. The grooves 116 also serve as guides that allow the carrier 104 to float, or slide, up and down in the cavity. Shoulders 117 atop the wall structure form a bottom floor for the ring 106 (as shown in FIG. 7) and prevent it from falling out of the bottom of the cavity. When the bottom roller 100 is not contacted by a bearing surface from below, it drops to a lower position out of contact with the top roller. When the bottom roller is riding along a supporting bearing surface, the bottom roller is pushed upward to an upper position into contact with the top roller stacked atop it. Because rolling frictional contact between the outer surfaces of the stacked rollers causes the rollers to wear and decrease in diameter, the floating lower-roller carrier 104 is inherently self-correctable to maintain effective frictional contact between the two rollers. And, as shown in FIG. 6, the bottom surface 36 of the belt module is concave 118, scalloped at the opening of the cavity onto the bottom surface of the belt to give the bearing surfaces continued access to the bottom rollers as they wear thinner and thinner.

Figure 10:
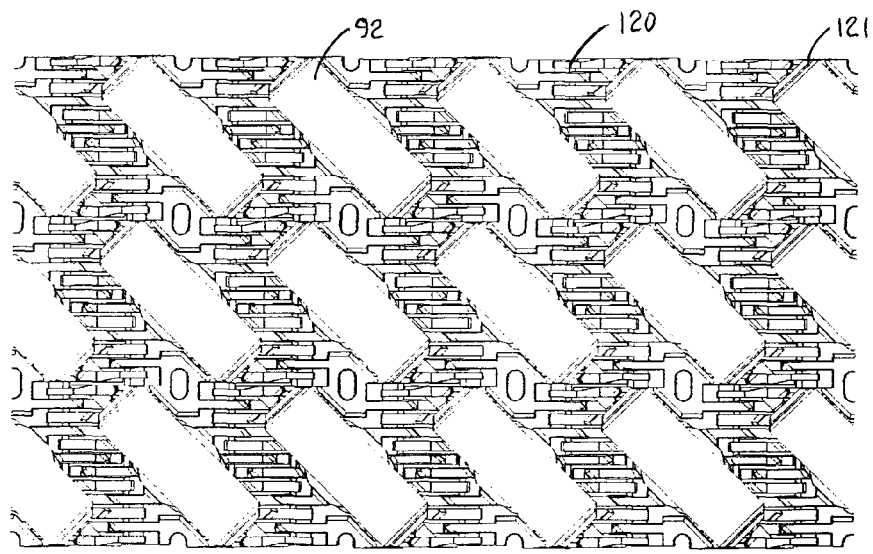
FIG. 10 is a top plan view of a portion of a conveyor belt made of modules as in FIG. 4.

In the exemplary stacked-roller assembly 72, the top roller 92 is longer than the bottom roller 100. The long top roller provides a greater area of roller coverage for articles conveyed on a belt constructed of the module 70, as illustrated in FIG. 10. The closely spaced top rollers provide a large amount of rolling support to articles. The corners 121 of the long top rollers may be beveled so that they do not extend past the sides of the modules. The bottom rollers 100, as shown in FIG. 6, can be axially shorter and require a smaller cavity with less disruption of the link-element structure that gives the module its strength.

Figure 9:
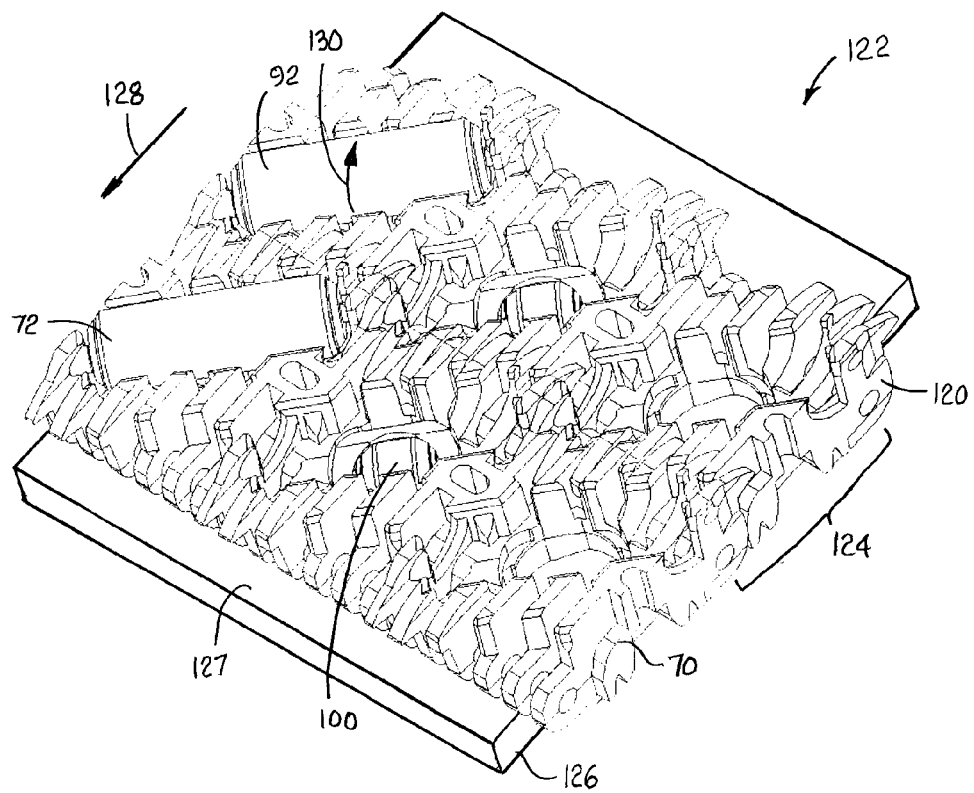
FIG. 9 is an isometric view of a portion of a conveyor belt constructed of belt modules as in FIG. 8.

A portion of a conveyor system 122 using the conveyor belt 120 of FIG. 10 is shown in FIG. 9 with some of the roller assemblies shown in various stages of assembly. For simplicity, the belt 120 is shown with one belt module 70 per row. But each row 124 could include more than one module to make a wider belt. Modules of different widths could be used to form the modules in a bricklay pattern. The belt 120 is shown supported on a carryway pan 126 providing bearing surfaces 127 for the bottom rollers 100 of the roller assembly 72. As the belt 120 is driven in a direction of belt travel 128, the bottom rollers 100 roll on the bearing surface 127 and are pushed upward into frictional rolling contact with the top rollers 92, which are rotated obliquely rearward—opposite to the rotation of the bottom rollers—as indicated by arrow 130. With the top and bottom rollers 92, 100 arranged oblique to the length and width of the belt, articles atop the top rollers can be pushed laterally across the width of the belt perpendicular to the direction of belt travel 128 because the rearward component of the tangential velocity of the oblique top roller is equal and opposite to the belt speed when the bearing surface is stationary. Other article trajectories can be achieved by changing the orientations of the rollers, incorporating gearing between the top and bottom rollers, and causing the bearing surface to move relative to the conveyor.

Figure 11:
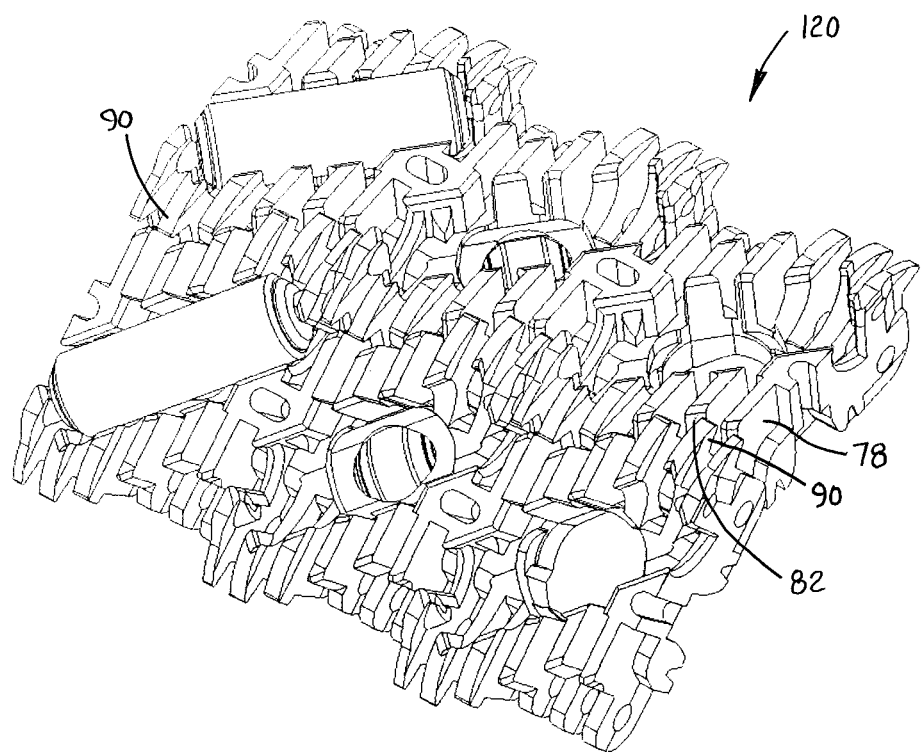
FIG. 11 is an isometric view of a portion of a conveyor belt as in FIG. 8 at maximum forward articulation.
Figure 12:
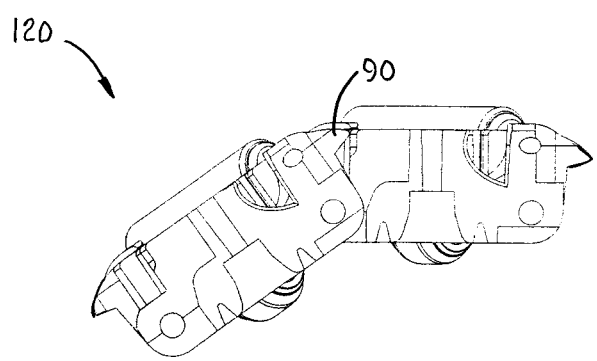
FIG. 12 is a side elevation view of the conveyor belt of FIG. 11.

A portion of the conveyor belt 120 is shown articulating forward in FIGS. 11 and 12 at the limit of its forward articulation range, which is determined by the diameter of the smallest sprocket to be used with the belt because articulation of the belt about the smallest sprocket creates the largest opening over the rods. The ribs are elevated to the height required to allow the protrusions 90 to overlap and close the gap. The protrusions 90 on adjacent rows overlap laterally with each other and with the distal ends 82 of the interleaved raised ribs 78 of the adjacent row. In this way, the hinge elements close as the belt articulates around the sprocket.

Although the invention has been described in detail with reference to a few versions, other versions are possible. For example, the roller assembly could have only a single roller that extends above the top surface only, the bottom surface only, or both surfaces. As another example, the hinge pin connecting the belt rows together could be realized as stubs extending laterally from some of the link ends and received in the holes of the interleaved link ends of adjacent rows. So, as these few examples suggest, the scope of the claims is not meant to be limited to the details of the exemplary versions.

What is claimed is:

1. A conveyor belt module comprising:
   a plurality of link elements laterally spaced apart and defining the module width and terminating in link ends along longitudinally opposite first and second module ends defining the module length;
   wherein each of the link elements has a bottom forming a bottom surface of the belt module and an opposite top;
   raised ribs extending in length longitudinally along the tops of at least some of the link elements to distal ends, wherein the raised ribs have an upper surface forming a top surface of the belt module and at least some of the raised ribs include protrusions that extend longitudinally from the distal ends of the raised ribs past the link ends.

2. A conveyor belt module as in claim 1 wherein the protrusions extend from upper portions of the raised ribs.

3. A conveyor belt module as in claim 1 wherein the protrusions have upper and lower surfaces that converge toward each other away from the distal ends of the raised ribs.

4. A conveyor belt module as in claim 3 wherein the lower surfaces slope upward away from the distal ends of the raised ribs.

5. A conveyor belt module as in claim 3 wherein the upper surfaces slope downward away from the distal ends of the raised ribs.

6. A conveyor belt module as in claim 1 wherein some of the raised ribs are short raised ribs that do not extend along the tops of the link elements as far as the link ends.

7. A conveyor belt module as in claim 6 wherein the distal ends of the short raised ribs are angled on a bias.

8. A conveyor belt module as in claim 6 wherein the distal ends of the short raised ribs are aligned along a line oblique to the module width.

9. A conveyor belt module as in claim 1 wherein some of the protrusions are longer than others.

10. A conveyor belt module as in claim 1 further comprising an intermediate portion disposed between the first and second module ends and having first and second sides longitudinally spaced apart, wherein a first set of the plurality of link elements extends longitudinally from the first side to the first module end and a second set of the plurality of link elements extends longitudinally from the second side to the second module end.

11. A conveyor belt module as in claim 10 further comprising a roller assembly and wherein the intermediate portion includes a cavity opening onto the top surface of the belt module and receiving the roller assembly.

12. A conveyor belt module as in claim 11 wherein the roller assembly includes a roller and an axle on which the roller rotates and wherein raised ribs bounding the cavity have holes receiving opposite ends of the axle to retain the roller rotatably in place in the cavity with a salient portion of the roller protruding from the cavity above the upper surface of the raised ribs.

13. A conveyor belt module as in claim 11 wherein the cavity extends through the raised ribs and the intermediate portion and opens onto the top and bottom surfaces of the belt module and wherein the roller assembly includes a top roller stacked above a bottom roller and wherein the bottom roller is mounted in a carrier slidable along the cavity from an upper position in which the bottom roller contacts the top roller and a lower position in which the bottom roller is out of contact with the top roller.

14. A conveyor belt module as in claim 13 wherein the carrier includes a ring and two diametrically opposed ears depending from the ring and wherein the roller assembly includes an axle whose opposite ends are supported in the ears and which rotatably retain the bottom roller with a salient portion of the roller extending through the ring.

15. A conveyor belt module as in claim 11 wherein the cavity opens onto the bottom surface of the belt module and wherein the bottom surface is concave at the cavity opening.

16. A conveyor belt module as in claim 1 wherein the raised ribs and the link elements have the same lateral thickness and the same longitudinal length.

17. A conveyor belt comprising:
   a series of rows of one or more belt modules hingedly linked together end to end to form a hinge axis between each row in a lateral direction perpendicular to a direction of belt travel about which the belt can articulate through an articulation range, each of the belt modules including:
      a plurality of link elements spaced apart in the lateral direction and terminating in link ends along opposite first and second module ends defining the module length longitudinally in the direction of belt travel;
      wherein each of the link elements has a bottom forming a bottom surface of the conveyor belt and an opposite top;
      raised ribs extending in length longitudinally along the tops of at least some of the link elements to distal ends, wherein the raised ribs have upper surfaces forming a top surface of the conveyor belt and at least some of the raised ribs include protrusions that extend longitudinally from the distal ends of the raised ribs past the link ends;
   wherein the link ends of belt modules of adjacent rows are interleaved at the hinge axis and the protrusions on adjacent rows are long enough to overlap along a lateral line of sight through the articulation range.

18. A conveyor belt as in claim 17 wherein at least some of the modules include a roller assembly and a cavity extending through the raised ribs and opening onto the top surface of the conveyor belt and receiving the roller assembly.

19. A conveyor belt as in claim 18 wherein the roller assembly includes a roller and an axle on which the roller rotates and wherein raised ribs bounding the cavity have holes receiving opposite ends of the axle to retain the roller rotatably in place in the cavity with a salient portion of the roller protruding from the cavity above the top surface of the conveyor belt.

20. A conveyor belt as in claim 18 wherein the cavity extends through the raised ribs and opens onto the top and bottom surfaces of the conveyor belt and wherein the roller assembly includes a top roller stacked above a bottom roller and wherein the bottom roller is mounted in a carrier slidable along the cavity from an upper position in which the bottom roller contacts the top roller and a lower position in which the bottom roller is out of contact with the top roller.

21. A conveyor belt as in claim 20 wherein the cavity opens onto the bottom surface of the conveyor belt and wherein the bottom surface is concave at the cavity opening to expose more of the lower roller below the bottom surface of the conveyor belt.

22. A conveyor comprising a conveyor belt as in claim 20 and bearing surfaces supporting the conveyor belt and contacting the bottom rollers to force them to the upper position into contact with the top rollers so that, when the bottom rollers rotate on the bearing surface as the conveyor belt advances in the direction of belt travel, the top rollers are rotated by the rotating bottom rollers.

* * * * *